(12) United States Patent
Wright et al.

(10) Patent No.: US 7,743,144 B1
(45) Date of Patent: Jun. 22, 2010

(54) SECURING AN ACCESS PROVIDER

(75) Inventors: Christopher J. Wright, Leesburg, VA (US); Patrick Hufford, Haymarket, VA (US); Terry Rolon, Haymarket, VA (US); Jonathan K. Robertson, Clifton, VA (US); Thomas Stehnach, Fairfax, VA (US); Rajkumar Jalan, Saratoga, CA (US)

(73) Assignees: Foundry Networks, Inc., Alviso, CA (US); AOL Inc., Dulles, VA (US)

( * ) Notice: Subject to any disclaimer, the term of this patent is extended or adjusted under 35 U.S.C. 154(b) by 1209 days.

(21) Appl. No.: 10/698,933

(22) Filed: Nov. 3, 2003

Related U.S. Application Data (63) Continuation of application No. 09/666,104, filed on Sep. 20, 2000, now abandoned.

(60) Provisional application No. 60/227,309, filed on Aug. 24, 2000.

(51) Int. Cl.
*G06F 15/173* (2006.01)
*G06F 15/167* (2006.01)
*G06F 15/16* (2006.01)

(52) U.S. Cl. .................. 709/225; 709/224; 709/217; 709/227; 709/223

(58) Field of Classification Search .......... 709/224, 709/227, 217, 223, 225; 714/4
See application file for complete search history.

(56) References Cited

U.S. PATENT DOCUMENTS

| | | | |
|---|---|---|---|
| 5,444,705 A * | 8/1995 | Olnowich et al. ........... 370/388 |
| 5,475,839 A | 12/1995 | Watson et al. |
| 5,546,390 A | 8/1996 | Stone |
| 5,548,533 A | 8/1996 | Gao et al. |
| 5,577,197 A * | 11/1996 | Beck ........................... 714/28 |
| 5,606,668 A | 2/1997 | Shwed |
| 5,619,648 A | 4/1997 | Canale et al. |
| 5,634,040 A | 5/1997 | Her et al. |
| 5,699,514 A | 12/1997 | Durinovic-Johri et al. |
| 5,704,047 A | 12/1997 | Schneeberger |

(Continued)

FOREIGN PATENT DOCUMENTS

EP    0889668    1/1999

(Continued)

OTHER PUBLICATIONS

Eric Allman, *Sendmail™ Installation and Operation Guide Version 8.310 for Sendmail Version 8.10*, Sendmail, Inc., (84 pages).

(Continued)

*Primary Examiner*—Paul H Kang
*Assistant Examiner*—Kristie D Shingles
(74) *Attorney, Agent, or Firm*—Fish & Richardson P.C.

(57) ABSTRACT

To secure an access provider, communications to/from the access provider are monitored for a partially-completed connection transaction. Detected partially-completed connection transactions are terminated when they remain in existence for a period of time that exceeds a threshold period of time. The monitoring may include detecting partially-completed connection transactions initiated by an access requestor, measuring the period of time that a partially-completed connection transaction remains in existence, comparing the period of time with the threshold period of time, and resetting a communication port located on the access provider.

35 Claims, 6 Drawing Sheets

U.S. PATENT DOCUMENTS

| | | | |
|---|---|---|---|
| 5,732,212 A | | 3/1998 | Perholtz et al. |
| 5,742,587 A | | 4/1998 | Zornig et al. |
| 5,805,810 A | | 9/1998 | Maxwell |
| 5,857,188 A | | 1/1999 | Douglas |
| 5,862,325 A | | 1/1999 | Reed et al. |
| 5,877,724 A | * | 3/1999 | Davis ...................... 342/357.1 |
| 5,884,246 A | | 3/1999 | Boucher et al. |
| 5,923,848 A | | 7/1999 | Goodhand et al. |
| 5,958,053 A | * | 9/1999 | Denker ......................... 726/1 |
| 5,999,932 A | | 12/1999 | Paul |
| 6,002,851 A | * | 12/1999 | Basavaiah et al. ............... 714/4 |
| 6,018,619 A | | 1/2000 | Allard et al. |
| 6,044,260 A | | 3/2000 | Eaton et al. |
| 6,049,774 A | * | 4/2000 | Roy .............................. 705/8 |
| 6,052,709 A | | 4/2000 | Paul |
| 6,072,942 A | | 6/2000 | Stockwell et al. |
| 6,088,736 A | | 7/2000 | Manning et al. |
| 6,092,115 A | | 7/2000 | Choudhury et al. |
| 6,105,012 A | | 8/2000 | Chang et al. |
| 6,161,130 A | | 12/2000 | Horvitz et al. |
| 6,167,029 A | | 12/2000 | Ramakrishnan |
| 6,167,434 A | | 12/2000 | Pang |
| 6,182,226 B1 | | 1/2001 | Reid et al. |
| 6,195,680 B1 | * | 2/2001 | Goldszmidt et al. ......... 709/203 |
| 6,205,551 B1 | | 3/2001 | Grosse |
| 6,212,184 B1 | | 4/2001 | Venkatachary et al. |
| 6,219,694 B1 | | 4/2001 | Lazaridis et al. |
| 6,219,706 B1 | | 4/2001 | Fan et al. |
| 6,219,786 B1 | * | 4/2001 | Cunningham et al. ....... 713/152 |
| 6,237,027 B1 | | 5/2001 | Namekawa |
| 6,266,664 B1 | | 7/2001 | Russell-Falla et al. |
| 6,286,049 B1 | | 9/2001 | Rajakarunanayake et al. |
| 6,310,859 B1 | * | 10/2001 | Morita et al. ................ 370/235 |
| 6,314,464 B1 | * | 11/2001 | Murata et al. ............... 709/226 |
| 6,321,267 B1 | | 11/2001 | Donaldson |
| 6,330,590 B1 | | 12/2001 | Cotten |
| 6,351,764 B1 | | 2/2002 | Voticky et al. |
| 6,351,794 B1 | | 2/2002 | Spilo et al. |
| 6,360,254 B1 | | 3/2002 | Linden et al. |
| 6,363,479 B1 | | 3/2002 | Godfrey et al. |
| 6,418,420 B1 | | 7/2002 | DiGiorgio et al. |
| 6,430,619 B1 | | 8/2002 | Sitaraman et al. |
| 6,484,203 B1 | | 11/2002 | Porras et al. |
| 6,496,866 B2 | * | 12/2002 | Attanasio et al. ............ 709/239 |
| 6,507,866 B1 | | 1/2003 | Barchi |
| 6,529,955 B1 | | 3/2003 | Sitaraman et al. |
| 6,535,517 B1 | * | 3/2003 | Arkko et al. ................ 370/401 |
| 6,542,583 B1 | | 4/2003 | Taylor |
| 6,580,790 B1 | | 6/2003 | Henry et al. |
| 6,591,291 B1 | | 7/2003 | Gabber et al. |
| 6,591,301 B1 | | 7/2003 | Li et al. |
| 6,615,241 B1 | | 9/2003 | Miller et al. |
| 6,636,894 B1 | | 10/2003 | Short et al. |
| 6,643,262 B1 | * | 11/2003 | Larsson et al. .............. 370/236 |
| 6,643,685 B1 | | 11/2003 | Millard |
| 6,643,686 B1 | | 11/2003 | Hall |
| 6,654,373 B1 | | 11/2003 | Maher, III et al. |
| 6,654,787 B1 | | 11/2003 | Aronson et al. |
| 6,662,230 B1 | | 12/2003 | Eichstaedt et al. |
| 6,678,835 B1 | | 1/2004 | Shah et al. |
| 6,691,156 B1 | | 2/2004 | Drummond et al. |
| 6,701,522 B1 | | 3/2004 | Rubin et al. |
| 6,732,149 B1 | | 5/2004 | Kephart |
| 6,738,814 B1 | * | 5/2004 | Cox et al. ................... 709/225 |
| 6,742,123 B1 | | 5/2004 | Foote |
| 6,742,128 B1 | | 5/2004 | Joiner |
| 6,748,422 B2 | | 6/2004 | Morin et al. |
| 6,751,668 B1 | | 6/2004 | Lin et al. |
| 6,757,836 B1 | * | 6/2004 | Kumar et al. ................... 714/4 |
| 6,763,467 B1 | | 7/2004 | Radatti et al. |
| 6,772,334 B1 | | 8/2004 | Glawitsch |
| 6,778,498 B2 | | 8/2004 | McDysan |
| 6,789,203 B1 | | 9/2004 | Belissent |
| 6,829,635 B1 | | 12/2004 | Townshend |
| 6,829,772 B2 | | 12/2004 | Foote et al. |
| 6,834,310 B2 | | 12/2004 | Munger et al. |
| 6,839,759 B2 | | 1/2005 | Larson et al. |
| 6,868,436 B1 | | 3/2005 | Fleming, III |
| 6,868,498 B1 | | 3/2005 | Katsikas |
| 6,894,972 B1 | | 5/2005 | Phaal |
| 7,032,023 B1 | | 4/2006 | Barrett et al. |
| 7,069,313 B2 | * | 6/2006 | Alam et al. .................. 709/223 |
| 7,103,599 B2 | | 9/2006 | Buford |
| 7,103,846 B1 | * | 9/2006 | Shafrir et al. ............... 715/751 |
| 7,197,639 B1 | * | 3/2007 | Juels et al. .................. 713/168 |
| 7,301,899 B2 | * | 11/2007 | Goldstone ................... 370/230 |
| 7,398,317 B2 | * | 7/2008 | Chen et al. .................. 709/229 |
| 7,437,457 B1 | * | 10/2008 | Eisendrath et al. .......... 709/225 |
| 7,454,499 B2 | * | 11/2008 | Cantrell et al. .............. 709/225 |
| 7,464,410 B1 | * | 12/2008 | Halasz et al. ................. 726/23 |
| 2002/0103916 A1 | | 8/2002 | Chen et al. |
| 2002/0107953 A1 | | 8/2002 | Ontiveros et al. |
| 2002/0108059 A1 | | 8/2002 | Canion et al. |
| 2002/0116463 A1 | | 8/2002 | Hart |
| 2003/0145232 A1 | | 7/2003 | Poletto et al. |
| 2003/0167402 A1 | | 9/2003 | Stolfo et al. |
| 2004/0064515 A1 | | 4/2004 | Hockey |
| 2004/0083270 A1 | | 4/2004 | Heckerman et al. |
| 2004/0093384 A1 | | 5/2004 | Shipp |
| 2006/0136590 A1 | | 6/2006 | Barrett et al. |

FOREIGN PATENT DOCUMENTS

| | | |
|---|---|---|
| WO | WO 99/03238 | 1/1999 |
| WO | WO 99/33188 | 7/1999 |

OTHER PUBLICATIONS

*Allowing controlled SMTP relaying in Sendmail 8.9*, (2 pages), http://web.archive.org/web/20000510213022/www.sendmail.org/tips/relaying.html.

*Anti-Spam Configuration Control*, (5 pages), http://web.archive.org/web/20000520064211/www.sendmail.org/m4/anti-spam.html.

*Anti-Spam Provisions in Sendmail 8.8*, (4 pages), http://web.archive.org/web/20000510040556/www.sendmail.org/antispam.html.

Mark Durham, *Spam Control in 8.10*, (3 pages), http://web.archive.org/web/20000618042433/sendmail.net/?feed=interview810-5.

Paul Boutin, *RFC 2476: Message Submission Agent*, (3 pages), http://web.archive.org/web/200010270602105/sendmail.net/?feed=rfc2476.

Paul Boutin, *RFC 2554: SMTP Authentication*, (4 pages), http://web.archive.org/web/20001016141928/sendmail.net/?feed=rfc2554.

*Relaying Denied/Allowed (in sendmail 8.8/8.9)*, Last Update Feb. 11, 2000, (2 pages), http://web.archive.org/web/20000418000700/www.sendmail.org/~ca/email/relayingdenied....

rfc2222, J. Myers, *Simple Authentication and Security Layer (SASL)*, (16 pages), Oct. 1997, The Internet Society (1997), http://web.archive.org/web/20001027153713/www.cis.ohio-state.edu/htbin/rfc/rfc2222.ht....

rfc2554, J. Myers, *SMTP Service Extension for Authentication*, (11 pages), Mar. 1999, The Internet Society (1999), http://web.archive.org/web/20001018181229/www.cis.ohio-state.edu/htbin/rfc/rfc2554.ht....

*Using SMTP AUTH in Sendmail 8.10*, (2 pages), Mar. 27, 2000, http://web.archive.org/web/20001016174022/sendmail.net/?feed=usingsmthpauth.

Godfrey, J., "Instant Spam: It's Tough to Swallow," *Home Office Computing*, [online] vol. 16, No. 11, p. 24 [retrieved on Dec. 29, 2004]. Retrieved from <URL: http://proquest.umi.com/pdqweb?index=21&sid=2&srchmode=1&vinst=PROD&fmt=4&startpage...>.

USPTO Final Office Action issued in U.S. Appl. No. 09/666,140, mailed Nov. 9, 2009, 17 pages.

* cited by examiner

SECURING AN ACCESS PROVIDER

CROSS REFERENCE TO RELATED APPLICATIONS

This application is a continuation application of U.S. application Ser. No. 09/666,104, filed Sep. 20, 2000, now abandoned, and titled "Securing An Access Provider," which claims the benefit of U.S. Provisional Application No. 60/227,309, filed Aug. 24, 2000, and titled "Securing An Accessible Computer System," both of which are incorporated by reference.

TECHNICAL FIELD

This invention relates to securing an access provider. More particularly, this invention relates to detecting and preventing denial of service attacks on an access provider.

BACKGROUND

Access providers have proven susceptible to various attacks by computer hackers. In a type of computer attack known as a denial of service attack, a hacker attempts to deny service to legitimate users of online computer services. For instance, a hacker may send a high number of illegitimate access requests to an accessible computer system of an access provider (hereinafter access provider), causing the access provider to dedicate its resources to handling the illegitimate access requests rather than handling legitimate access requests from legitimate users. In this manner, legitimate users may be denied access to an online computer service enabled by the access provider because of the influx of illegitimate access requests sent by the hacker. This type of attack is commonly known as a synchronize (SYN) flood.

Another type of a computer attack occurs when a hacker attempts to gain unauthorized access to an online computer service through an access provider. In this type of attack, the hacker uses a client to attempt to establish an unauthorized connection with the access provider. For instance, the hacker begins by identifying a logon identification known to be valid. The hacker then attempts to crack the password associated with the valid logon identification. For instance, the hacker may use a computer program to associate several passwords with the logon identification in rapid succession, repeatedly attempting to establish a connection with the access provider using the known logon identification and one of the associated passwords. This type of attack may tax processing resources to effectively deny legitimate users access to the online computer service.

When subject to such attacks, access providers may be forced to cease operation.

SUMMARY

In one general aspect, securing an access provider includes monitoring communications with at least one access provider for a partially-completed connection transaction and terminating the partially-completed connection transaction when the partially-completed connection transaction remains in existence for a period of time that exceeds a threshold period of time.

Embodiments may include one or more of the following features. For example, the monitoring may include detecting partially-completed connection transactions initiated by an access requestor, measuring the period of time that a partially-completed connection transaction remains in existence, and comparing the period of time with the threshold period of time.

The monitoring also may include monitoring communications with at least one access provider based on TCP communications for partially-completed connection transactions. The monitoring may include monitoring a process whereby an access requestor sends a SYN request and the access provider sends a SYN acknowledgement. The monitoring may include monitoring communications with a plurality of access providers for partially-completed connection transactions.

The monitoring also may include detecting partially-completed connection transactions that occur when an access requestor initiates a connection transaction and the access requestor subsequently fails to send a reply. More particularly, the monitoring may include detecting partially-completed connection transactions that occur when an access requestor initiates a connection transaction based on a return address that differs from an actual return address of the access requestor. This particular instance may occur when the return address is an Internet protocol address that differs from the actual return address of the access requestor.

Where the access requestor is a client and the access provider is a host, the monitoring may include detecting partially-completed connection transactions between at least one client and at least one host, and/or detecting partially-completed connection transactions between at least once client and a plurality of hosts and/or detecting partially-completed connection transactions between a plurality of clients and at least one host.

The terminating may include resetting a communication port located on the access provider. When the threshold period of time is configurable, the terminating also may include terminating the partially-completed connection transaction when the partially-completed connection transaction remains in existence for a period of time that exceeds a configurable threshold period of time.

These general and specific aspects may be implemented using a system or method or combination of system and method.

The details of one or more embodiments are set forth in the accompanying drawings and the description below. Other features and advantages will be apparent from the description and drawings, and from the claims.

DESCRIPTION OF DRAWINGS

Like reference symbols in the various drawings may indicate like elements.

DETAILED DESCRIPTION

Figure 1:
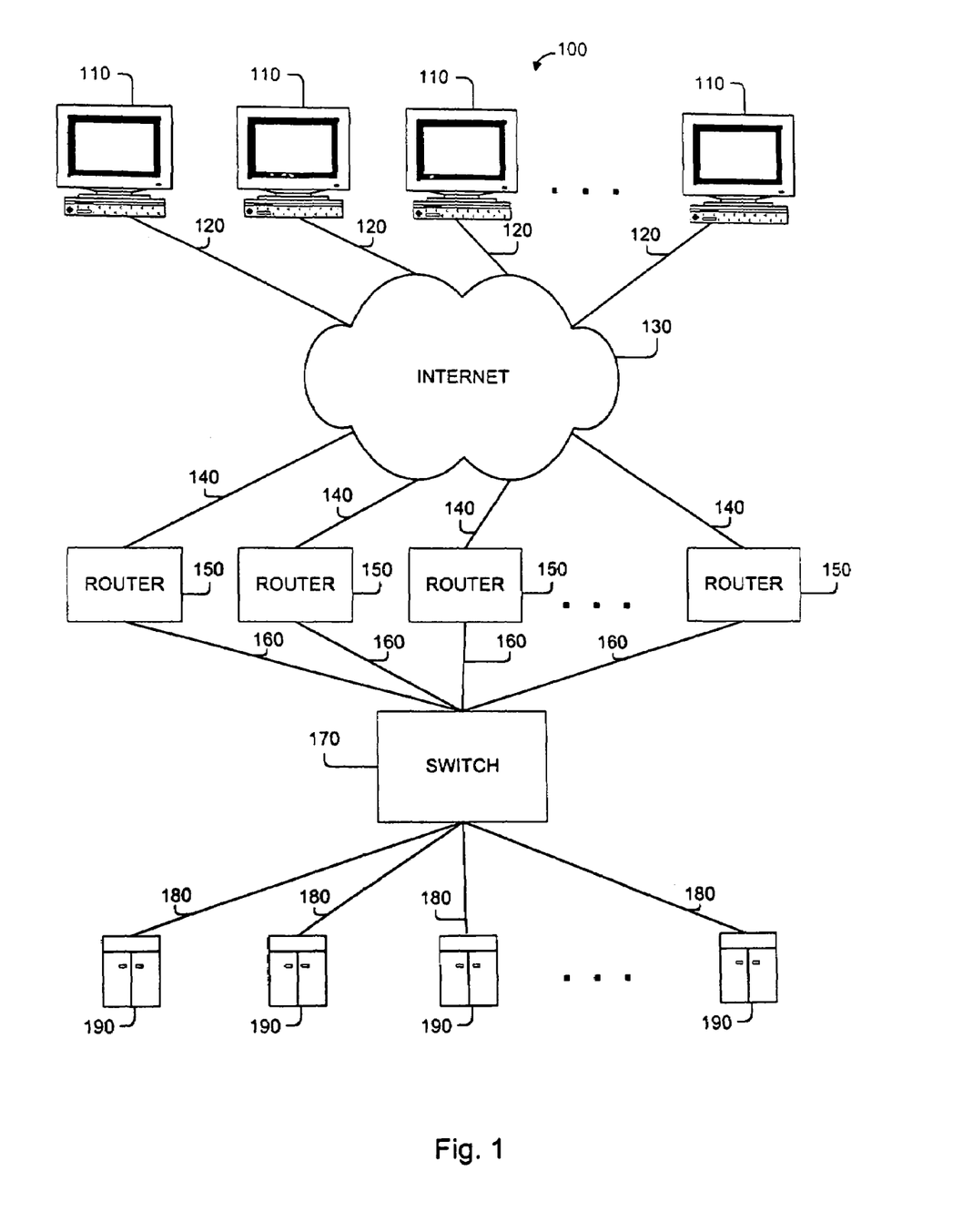
FIG. 1 is a block diagram that illustrates the physical level of a system for securing an access provider.

FIG. 1 is a block diagram that illustrates the physical level of an accessible computer system 100. FIG. 1 shows multiple access requestors 110, the Internet 130, multiple routers 150, switch 170, multiple access providers 190, and multiple communication links 120, 140, 160, and 180.

An access requestor 110 may include a client, and may be embodied in a general-purpose computer (e.g., a personal computer), a special-purpose computer, a workstation, a server, a personal digital assistant, an electronic organizer, a mobile phone, a pager, a device, a component, or other physical or virtual equipment or some combination thereof, any of which may be programmed or configured to respond to and execute instructions in a defined manner. Access requestors 110 are connected to the Internet 130 by communication links 120.

The Internet 130 is an example of a delivery network that may be used to enable communications to/from access requestors 110. Other examples of a delivery network may include the World Wide Web, wide area networks (WANs), local area networks (LANs), analog or digital wired and wireless telephone networks (e.g. Public Switched Telephone Network (PSTN), Integrated Services Digital Network (ISDN), and Digital Subscriber Lines (xDSL)), radio, television, cable, satellite, and/or any other delivery mechanism for carrying data. The Internet 130 is generally connected to one or more routers 150 by communication links 140.

Each router 150 generally includes a computer processor, computer software, a hardware device, other physical or virtual equipment or some combination of these elements that is capable of receiving, processing and transmitting information. In general, each router 150 routes communications between one or more access requestors 110 and one or more access providers 190. Communications received from an access provider 190 are generally routed to an access requestor 110 through the Internet 130. Communications received from an access requestor 110 are generally routed to an access provider 190 through a switch 170. More specifically, each router 150 receives a data packet and/or data request from access requestor 110 and routes the data packet and/or data request through switch 170 to one or more of the access providers 190 based on predefined criteria or algorithms. The routers 150 are connected to switch 170 by communication links 160.

Switch 170 generally includes one or more hardware components and one or more software components. It is capable of receiving a unit of data and of transmitting the received data to one or more access providers 190 or routers 150 based on predefined criteria or algorithms. Switch 170 may perform load balancing algorithms such as hashing techniques to avoid overwhelming any particular router 150 or access provider 190. Switch 170 also may perform the functions of the router 150 as a separate or integrated component or device. Additionally or alternatively, switch 170 may include one or more processors and one or more storage and memory devices, such as internal memory. The switch 170 is connected to multiple access providers 190 by communication links 180.

An access provider 190 may be any software or hardware capable of providing access by an access requestor 110 to desired information or services. For instance, an access provider 190 may include a host, and it may be embodied in a general-purpose computer (e.g., a personal computer) or a special-purpose computer capable of communicating with one or more access requestors 110 by responding to and executing instructions in a defined manner. Other examples of an access provider 190 include a special-purpose computer, a work station, a server, a device, a component, other physical or virtual equipment or some combination of these elements that is capable of responding to and executing instructions as described.

Communication links 120, 140, 160 and 180 may include, for example, a wired, wireless, cable or satellite communication pathway.

Figure 2:
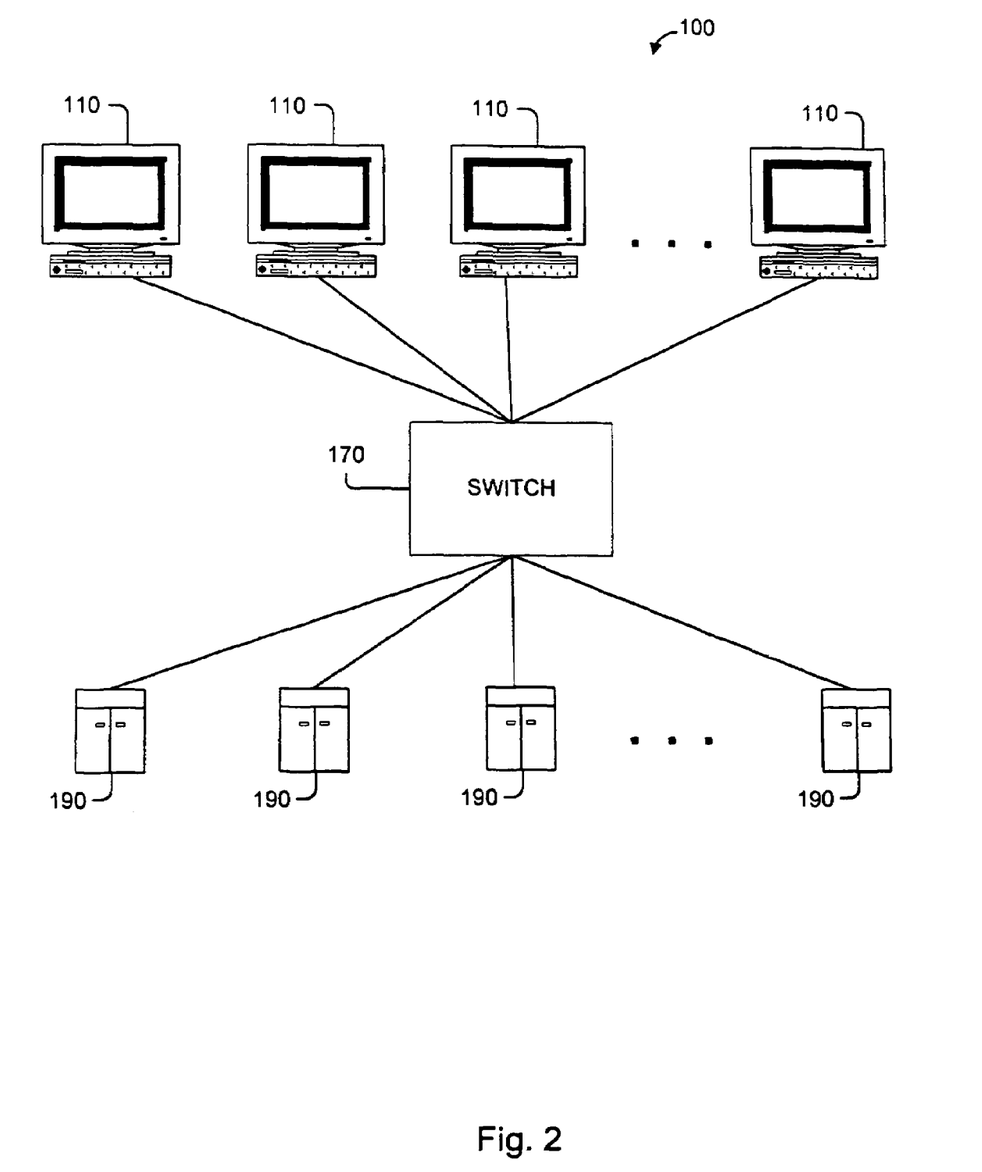
FIG. 2 is a block diagram that illustrates the logical level of a system for securing an access provider of FIG. 1.

FIG. 2 is a block diagram that illustrates a logical level of the system 100 illustrated in FIG. 1. FIG. 2 shows multiple access requestors 110, switch 170, and multiple access providers 190. In this figure, switch 170 may be representative of one or more of Internet 130, router 150 and switch 170, or some combination there between such as that described in FIG. 1.

An access requestor 110 is generally used to establish a physical or non-physical electronic connection with an access provider 190. Connections may be established on various levels using various protocols. For instance, a connection may be established on Level III (e.g., a packet based level), on Level IV (e.g., a protocol data unit based level with flow control and error correction) or on some other level using an appropriate protocol capable of establishing a connection between an access requestor 110 and an access provider 190. More specifically, examples of protocols include Transmission Control Protocol (TCP), Internet Protocol (IP), TCP/IP, User Datagram Protocol (UDP), and UDP/IP.

Access protocols are observed to establish a connection. In an exemplary Level IV protocol, an access requestor 110 sends an access request through switch 170. The request is routed to one of the access providers 190, which responds to the access request by sending an acknowledgement that is routed back to the access requestor 110 through switch 170. When the access requestor 110 receives the acknowledgement sent by the access provider 190, the access requestor 110 generates an acknowledgement that is sent back to the access provider 190 through switch 170. The completion of this transaction establishes a connection between the access requestor 110 and the access provider 190.

For purposes of this detailed description, the term connection transaction is used to describe one or more of sending, receiving, or exchanging the units of data necessary to use a protocol (e.g., TCP, IP, UDP, TCP/IP, and UDP/IP) to establish a communication link (e.g., wired, wireless, cable, and satellite) between the access requestor 110 and access provider 190. One example of a connection transaction results in a TCP connection between the access requestor 110 and the access provider 190, where procedures to establish a connection transaction use the synchronize (SYN) control flag and involve an exchange of three messages. In this example, an access requestor 110 sends an access request (SYN REQ) to an access provider 190 through switch 170. The access provider 190 responds to the access requestor 110 through switch 170 with an acknowledgement (SYN ACK). Then, the access requestor 110 sends an acknowledgement (ACK) to access provider 190 via switch 170. Other connection transactions between access requestor 110 and access provider 190 through switch 170 are also possible and can result in different types of connections (e.g., IP, TCP/IP, UDP, and UDP/IP).

For purposes of this detailed description, the term partially-completed connection transaction is used to describe one or more of sending, receiving, or exchanging data that is necessary to establish a connection transaction under a protocol (e.g., TCP, IP, UDP, TCP/IP, and UDP/IP) but that is insufficient to establish a communications link (e.g., wired, wireless, cable, and satellite) between the access requestor 110 and access provider 190. One example of a partially-completed connection transaction occurs during an attempt to establish a TCP connection between access requestor 110 and access provider 190. In this example, an access requestor 110 sends an access request (SYN REQ) to an access provider 190 through switch 170. In response to the access request, the access provider 190 opens a communication port and sends an acknowledgement (SYN ACK) to the access requestor 110 through switch 170. The access requestor 110 fails to send a reply (ACK) to the access provider 190 via switch 170. This failure to send a reply results in the partially-completed connection transaction.

Another type of partially-completed connection transaction may occur when an illegitimate access requestor 110 initiates a connection transaction based on a spoofed return address that differs from an actual return address of the illegitimate access requestor 110. In this instance, the illegitimate access requestor 110 sends an access request (SYN REQ) to the access provider 190 via switch 170 using the spoofed return address. In response to the access request, the access provider 190 opens a communication port. Then, because the access request is spoofed, the access provider 190 sends an acknowledgement (SYN ACK) to the spoofed return address, which differs from the actual return address of the illegitimate access requestor 110. Thereafter, no reply (ACK) is generated by the illegitimate access requestor 110, which does not even receive the acknowledgement (SYN ACK) sent by the access provider 190 to the spoofed return address. Thus, the attempted TCP connection is only a partially-completed connection transaction. In this example, the spoofed return address may be Internet protocol (IP) addresses which is capable of identifying each sender or receiver of information across the Internet 130.

When a partially-completed connection transaction occurs, the communication port that was opened on the access provider 190 remains opened, awaiting completion of the initiated connection transaction. Consequently, one of a finite number of communication ports on access provider 190 is used. Other partially-completed connection transactions between access requestor 110 and access provider 190 may occur on other levels (e.g., Level III) using other types of protocols (e.g., IP, TCP/IP, UDP, and UDP/IP).

Figure 3:
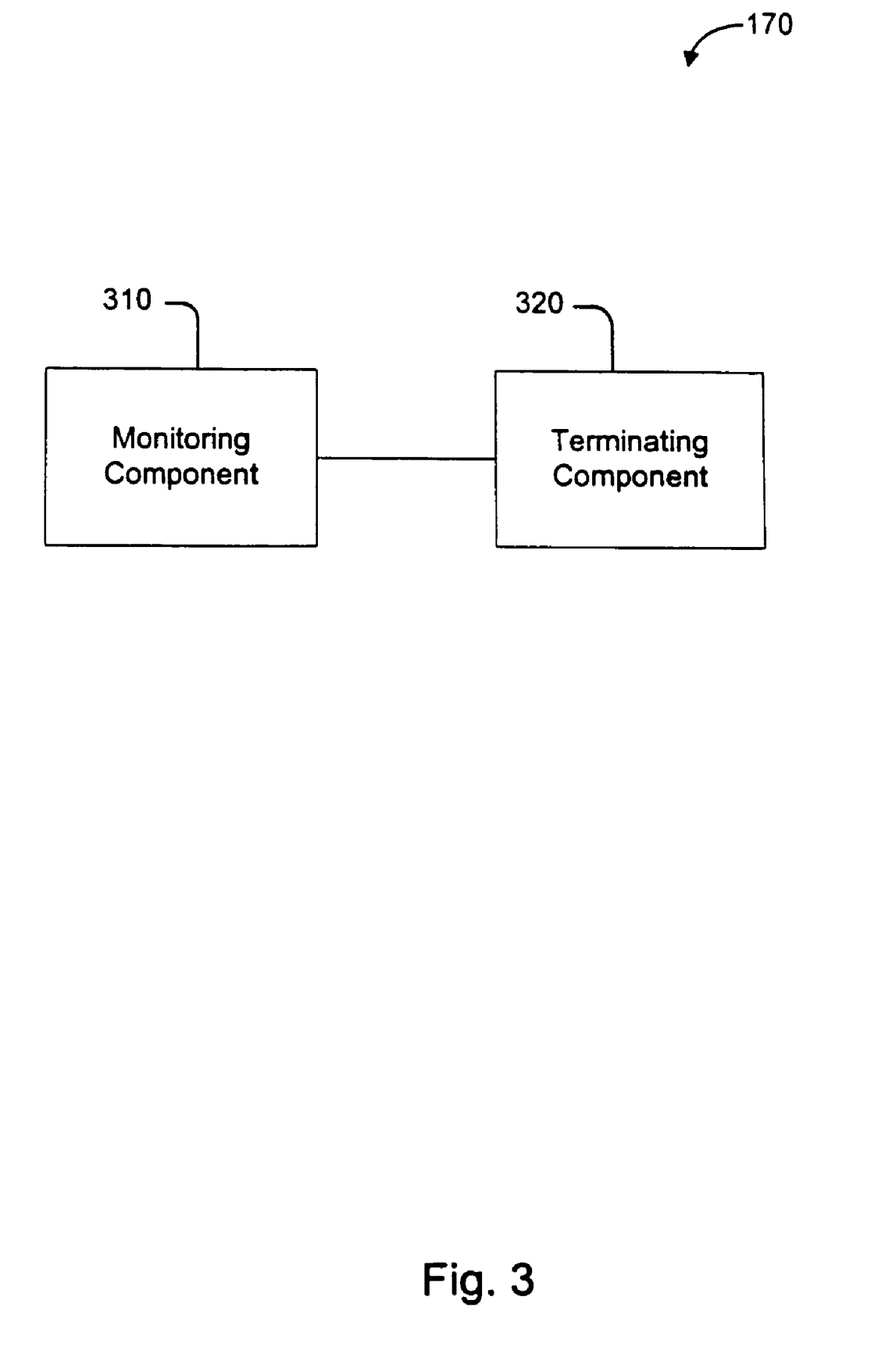
FIG. 3 is a block diagram that illustrates components included in a switch such as those shown by FIGS. 1 and 2.

FIG. 3 is a block diagram that illustrates logical components of switch 170. As shown, the switch 170 includes the components necessary to detect and prevent a hacker attack on access providers 190. In particular, switch 170 includes a monitoring component 310 and a terminating component 320, which generally include one or more elements embedded in software modules, but may be embodied in physical devices connected to one another or may be embodied in some combination of software modules and physical devices. In other implementations, the components illustrated in FIG. 3 may be resident on an access provider 190.

The monitoring component 310 is generally structured and arranged to monitor communications with at least one access provider 190 for partially-completed connection transactions. In one example, the monitoring component 310 may be structured and arranged to detect partially-completed connection transactions by monitoring communications performed to establish a connection involving an access provider 190 based on TCP protocol. In another example, the monitoring component 310 may be structured and arranged to monitor communications with several access providers 190 to detect partially-completed connection transactions. Additionally or alternatively, monitoring component 310 may be programmed to recognize partially-completed connection transactions based on other criteria, or other partially-completed connection transaction types altogether (e.g., IP, TCP/IP, UDP, and UDP/IP). The monitoring component 310 may be preconfigured or it maybe programmable, as will be described in FIG. 4.

The terminating component 320 is generally structured and arranged to terminate partially-completed connection transactions when the partially-completed connection transactions remain in existence for a period of time that exceeds a threshold period of time.

Figure 4:
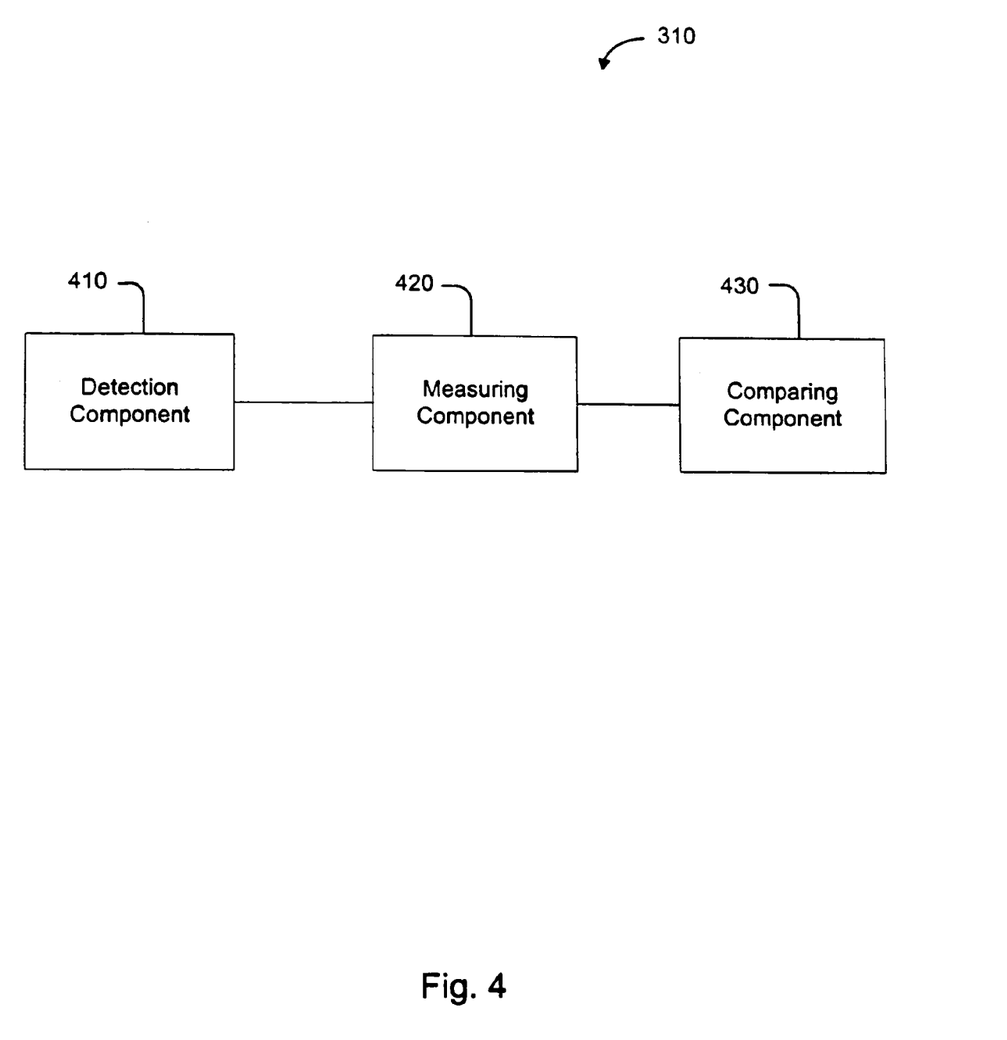
FIG. 4 is a block diagram that illustrates components included in a monitoring component of the switch of FIG. 3.

Referring to FIG. 4, the monitoring component 310 may include a detection component 410, a measuring component 420, and a comparing component 430. The detection component 410 is generally structured and arranged to detect partially-completed connection transactions initiated by an access requestor 110. The detection component 410 is generally programmable and capable of recognizing when a partially-completed connection transaction occurs. For example, detection component 410 may be programmed to recognize a partially-completed connection transaction that occurs when an access requestor 110 initiates a connection transaction and the access requestor 110 subsequently fails to send a reply. In one scenario described above with respect to FIG. 2, the detection component 410 may detect partially-completed connection transactions that occur when an illegitimate access requestor 110 initiates a connection transaction based on a spoofed return address (e.g., IP address) that differs from an actual return address (e.g., IP address) of the illegitimate access requestor 110.

Where the access requestor 110 includes one or more clients and the access provider 190 includes one or more hosts, the detection component 410 is capable of detecting partially-completed connection transactions between at least one client and at least one host. Additionally or alternatively, where the access requestor 110 includes one or more clients and the access provider 190 includes one or more hosts, the detection component 410 may be capable of detecting partially-completed connection transactions between at least one client and multiple hosts and/or between multiple clients and at least one host. The detection component 410 generally communicates with to the measuring component 420.

The measuring component 420 is generally structured and arranged to measure the period of time that a partially-completed connection transaction remains in existence. The measuring component 420 is generally programmable. Measuring component 420 may be implemented using a processor and an internal memory for measuring and recording the period of time. It may be implemented using software performed by a processor, or it may be implemented using some combination of hardware and software. In the example of a partially-completed connection transaction based on TCP communications, measuring component 420 measures a period of time that starts when an access request (SYN REQ) is first received. Alternatively, measuring component 420 may measure a period of time that starts when the access provider 190 opens a communication port, perhaps starting when the acknowledgement (SYN ACK) is sent in response to an access request (SYN REQ). In this way, measuring component 420 may measure and record the period of time that the communication port remains in existence.

Measuring component 420 is capable of measuring the period of time across multiple access providers 190. The measuring component 420 communicates with the comparing component 430.

The comparing component 430 is generally structured and arranged to compare the period of time measured by the measuring component 420 with a threshold period of time. In the preferred implementation, the threshold period of time is set to a fixed period of time. Alternatively, the threshold period of time may be a configurable threshold period of time such that the threshold period of time may be set to any period of time.

When the comparing component 430 determines that the threshold period of time has been exceeded, terminating component 320 generally terminates the partially-completed connection transaction. In one example, terminating component 320 includes a reset component that is structured and arranged to reset a communication port located on the access provider 190. In the instance when the partially-completed connection transaction is based on TCP communications, the communication port on the access provider 190 may be reset when the port remains in existence in excess of the threshold period of time which typically occurs when access provider 190 does not receive a reply (ACK) from access requestor 110. When the communication port is reset, it becomes available for use in response to a new access request (SYN REQ).

Additionally or alternatively, when the comparing component 430 determines that the threshold period of time has been exceeded, terminating component 320 may delay terminating the partially-completed connection transaction to allow the monitoring component 310 to continue monitoring communications with the access provider 190. The terminating component 320 may also block any future access requests from a particular illegitimate access requestor 110 through the use of a header that identifies the IP address of the illegitimate access requestor 110.

Figure 5:
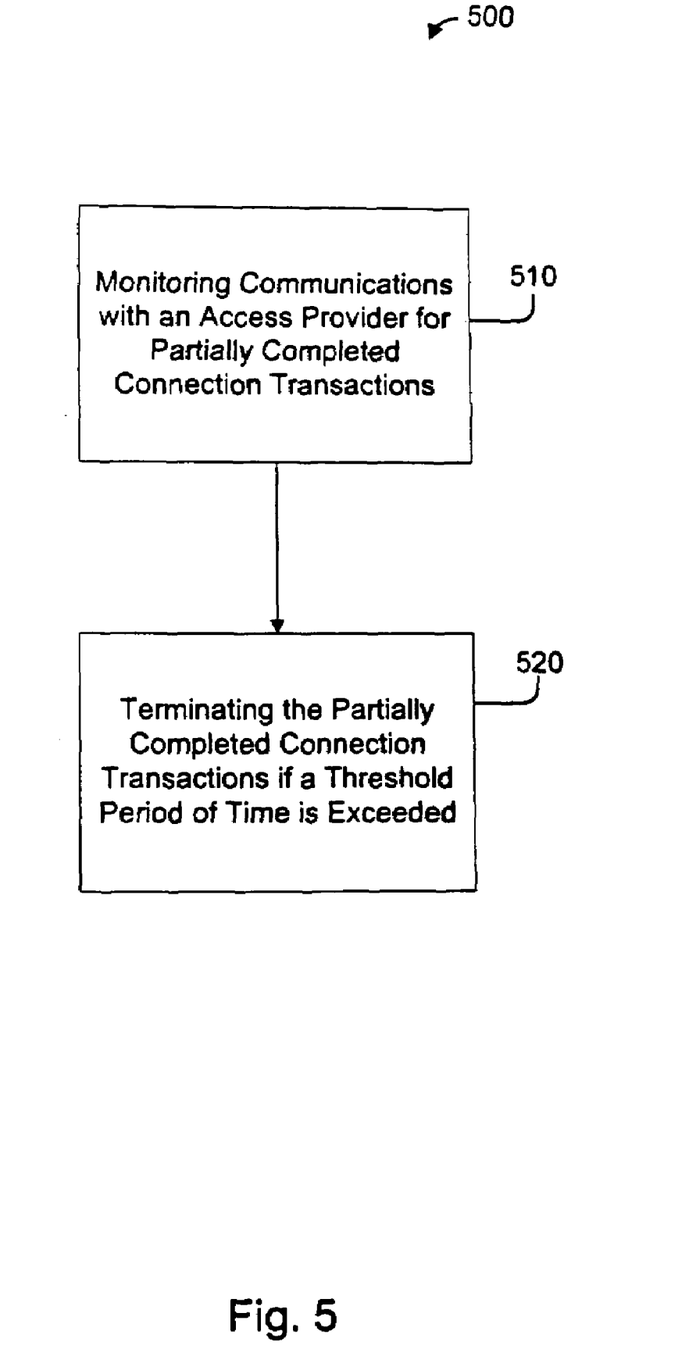
FIG. 5 is a flowchart of a process for securing an access provider, which may be performed by the systems shown by FIGS. 1-4.

Referring to FIG. 5, a process 500 is described for securing an access provider 190, which process 500 may be performed by the systems described above with respect to FIGS. 1-4. For instance, the process 500 may be performed by a switch 170, by an access provider 190, or by a combination of the two. The process also may be performed by any other hardware device or software device capable of being programmed to receive, process, and send instructions in the manner described. The process 500 generally includes monitoring communications with an access provider 190 for partially-completed connection transactions (step 510) and terminating the partially-completed connection transactions when the partially-completed connection transactions remain in existence for a period of time that exceeds a threshold period of time (step 520).

In one example, step 510 includes monitoring at least one access provider 190 to detect partially-completed connection transactions by monitoring communications performed to establish a connection involving the access provider 190 based on TCP protocol. In this instance, an access requestor 110 sends an access request (SYN REQ). In response to the access request, the access provider 190 opens a communication port and sends an acknowledgement (SYN ACK) to the access requestor 110. The partially-completed connection transaction may be detected based on a failure of the access requestor 110 to send a reply (ACK) to the access provider 190. For instance, the monitoring step 510 may monitor communication ports to determine whether a connection port that has been opened in response to the access request by the access provider 190 remains in existence beyond the threshold period of time. Additionally or alternatively, step 510 may include monitoring communications with multiple access providers 190 for partially-completed connection transactions.

Step 520 generally includes terminating the partially-completed connection transaction when the partially-completed connection transaction remains in existence for a fixed period of time (e.g., six seconds). Alternatively or additionally, the threshold period of time may be configurable such that it may be set for any period of time.

Figure 6:
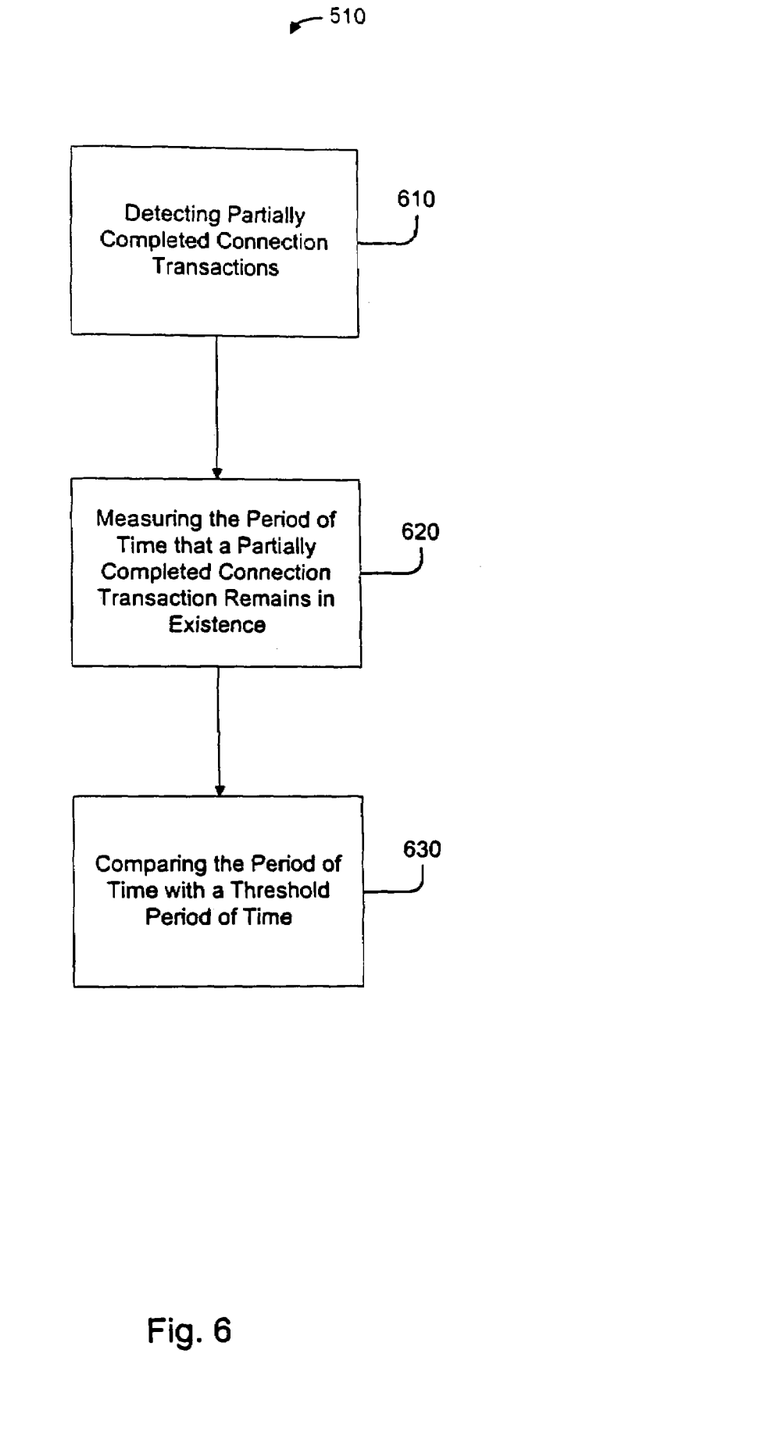
FIG. 6 is a flowchart of a process for monitoring the access provider for partially-completed connection transactions as part of the process of FIG. 5.

Referring to FIG. 6, monitoring communications with the access provider 190 for partially-completed connection transactions (step 510 of FIG. 5) may include detecting partially-completed connection transactions (step 610), measuring the period of time that a partially-completed connection transaction remains in existence (step 620), and comparing the period of time with a threshold period of time (step 630).

Detecting 610 may include detecting partially-completed connection transactions that occur when an access requestor 110 initiates a connection transaction and the access requestor 190 subsequently fails to send a reply. In one scenario described above, the detecting 610 may include determining whether an illegitimate access requestor 110 has initiated a connection transaction based on a spoofed return address (e.g., IP address) that differs from the actual return address (e.g., IP address) of the illegitimate access requestor 110. Where the access requestor 110 is a client and the access provider 190 is a host, detecting 610 may include detecting partially-completed connection transactions between at least one client and at least one host. Additionally or alternatively, detecting may include detecting partially-completed connection transactions between at least one client and multiple hosts and/or multiple clients and at least one host. Detecting also may include recognizing other connection transactions or their components (e.g., IP, TCP/IP, UDP, and UDP/IP).

Measuring 620 generally includes measuring the period of time that a partially-completed connection transaction remains in existence. In the example of a partially-completed connection transaction based on TCP communications, the access provider 190 opens a communication port when it receives an access request (SYN REQ) from an access requestor 110. In the instance when the partially-completed connection transaction is based on TCP communications, measuring may measure a period of time that starts when an access request (SYN REQ) is first received. Alternatively, measuring may measure a period of time that starts when the access provider 190 opens a communication port and sends an acknowledgement (SYN ACK) in response to an access request (SYN REQ). Measuring determines the length of the period of time that the communication port remains in existence. Measuring also may include recording the period of time that the communication port remains in existence. Additionally or alternatively, measuring 620 may include measuring the period of time that other types of partially-completed connection transactions (e.g., IP, TCP/IP, UDP, and UDP/IP) remain in existence.

Comparing 630 generally includes comparing the period of time with a threshold period of time. The threshold period of time may be configurable. If the period of time exceeds the threshold period of time, step 520 terminates the partially-completed connection transaction. Terminating 520 may include resetting the communication port on the access provider 190 that was opened in response to an access request initiated by access requestor 110. In the instance when the partially-completed connection transaction is based on TCP communications, the communication port on the access provider 190 may be reset when the port remains in existence in excess of the threshold period of time which typically occurs when access provider 190 does not receive a reply (ACK) from access requestor 110. When the communication port is reset, it becomes available for use in response to a new access request (SYN REQ). Additionally or alternatively, terminating 520 may delay resetting the communication port to allow monitoring 510 to continue monitoring communications with the access provider 190. Terminating 520 also may block future access requests from an illegitimate requestor 110 through the use of a header that identifies the IP address of the illegitimate access requestor 110.

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components.

In addition, the systems, methods, and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM disks). Any of the foregoing may be supplemented by, or incorporated in, specially-designed ASICs (application-specific integrated circuits).

Accordingly, other embodiments are within the scope of the following claims.

What is claimed is:

1. A method of monitoring access requests to access providers comprising:
    observing, using an intermediary device other than an access providing host that assigns resources responsive to inbound access requests, information identifying a requestor based on receipt of the requestor's submission of an access request to a first access providing host;
    accessing, using the intermediary device, stored information identifying previous requestors, of the first access providing host as well as of other access providing hosts, that are determined to have submitted a previous access request that has timed out prior to submission of an acknowledgement corresponding to the previous access request;
    comparing, using the intermediary device, the observed information identifying the requestor to the stored information identifying previous requestors; and
    when the comparison reveals that the requestor has submitted a previous access request that has timed out prior to submission of an acknowledgement corresponding to the previous access request, denying, using the intermediary device, the access request submitted by the requestor while denying passage of the access request to the first access providing host,
    wherein the intermediary device is a switch capable of performing load balancing for the first access providing host as well as the other access providing hosts.

2. The method of claim 1 wherein denying, using the intermediary device, the access request submitted by the requestor while denying passage of the access request to the first access providing host comprises denying, using the intermediary device, the access request submitted by the requestor when the comparison reveals that the requestor has submitted a previous access request that has timed out prior to submission of an acknowledgement corresponding to the previous access request based on a previous access request submitted to an access providing host other than the first access providing host.

3. The method of claim 1 further comprising:
    denying the access request in response to a determination that a return address included in the access request differs from an actual return address of the requestor's device.

4. The method of claim 1 further comprising, when the comparison reveals that the requestor has not submitted a previous access request that has timed out prior to submission of an acknowledgement corresponding to the previous access request, monitoring, using the intermediary device, a partially-completed connection transaction resulting from the access request to determine whether a time out condition occurs prior to requestor submission of an acknowledgement corresponding to the access request.

5. The method of claim 4 further comprising, to the extent that a time out condition is determined to exist, adding, using the intermediary device, information identifying the requestor to the stored information identifying previous requestors for use in comparing against future requestors that submit an access request.

6. A networking device, other than an access providing host that assigns resources responsive to inbound access requests, comprising:
    a processor; and
    a memory encoded with machine readable instructions that, when executed by the processor, operate to cause the processor to perform operations comprising:
        observing information identifying a requestor based on receipt of the requestor's submission of an access request to a first access providing host;
        accessing stored information identifying previous requestors, of the first access providing host as well as of other access providing hosts, that are determined to have submitted a previous access request that has timed out prior to submission of an acknowledgement corresponding to the previous access request;
        comparing the observed information identifying the requestor to the stored information identifying previous requestors; and
        when the comparison reveals that the requestor has submitted a previous access request that has timed out prior to submission of an acknowledgement corresponding to the previous access request, denying the access request submitted by the requestor while denying passage of the access request to the first access providing host, wherein the networking device is a switch capable of performing load balancing for the first access providing host as well as the other access providing hosts.

7. The networking device of claim 6 wherein denying the access request submitted by the requestor while denying passage of the access request to the first access providing host comprises denying the access request submitted by the requestor when the comparison reveals that the requestor has submitted a previous access request that has timed out prior to submission of an acknowledgement corresponding to the previous access request based on a previous access request submitted to an access providing host other than the first access providing host.

8. The networking device of claim 6 wherein the memory is further encoded with machine readable instructions that, when executed by the processor, operate to cause the processor to perform operations comprising:

denying the access request in response to a determination that a return address included in the access request differs from an actual return address of the requestor's device.

9. The networking device of claim 6 wherein the memory is further encoded with machine readable instructions that, when executed by the processor, operate to cause the processor to perform operations comprising, when the comparison reveals that the requestor has not submitted a previous access request that has timed out prior to submission of an acknowledgement corresponding to the previous access request, monitoring a partially-completed connection transaction resulting from the access request to determine whether a time out condition occurs prior to requestor submission of an acknowledgement corresponding to the access request.

10. The networking device of claim 9 wherein the memory is further encoded with machine readable instructions that, when executed by the processor, operate to cause the processor to perform operations comprising, to the extent that a time out condition is determined to exist, adding information identifying the requestor to the stored information identifying previous requestors for use in comparing against future requestors that submit an access request.

11. A storage medium encoded with instructions that, when executed by a processing device, operate to cause the processing device to perform operations comprising:

observing, using an intermediary device other than an access providing host that assigns resources responsive to inbound access requests, information identifying a requestor based on receipt of the requestor's submission of an access request to a first access providing host;

accessing, using the intermediary device, stored information identifying previous requestors, of the first access providing host as well as of other access providing hosts, that are determined to have submitted a previous access request that has timed out prior to submission of an acknowledgement corresponding to the previous access request;

comparing, using the intermediary device, the observed information identifying the requestor to the stored information identifying previous requestors; and when the comparison reveals that the requestor has submitted a previous access request that has timed out prior to submission of an acknowledgement corresponding to the previous access request, denying, using the intermediary device, the access request submitted by the requestor while denying passage of the access request to the first access providing host, wherein the intermediary device is a switch capable of performing load balancing for the first access providing host as well as the other access providing hosts.

12. The storage medium of claim 11 wherein denying, using the intermediary device, the access request submitted by the requestor while denying passage of the access request to the first access providing host comprises denying, using the intermediary device, the access request submitted by the requestor when the comparison reveals that the requestor has submitted-a previous access request that has timed out prior to submission of an acknowledgement corresponding to the previous access request based on a previous access request submitted to an access providing host other than the first access providing host.

13. The storage medium of claim 11 wherein the storage medium is further encoded with instructions that, when executed by the processing device, operate to cause the processing device to perform operations comprising:

denying the access request in response to a determination that a return address included in the access request differs from an actual return address of the requestor's device.

14. The storage medium of claim 11 wherein the storage medium is further encoded with instructions that, when executed by the processing device, operate to cause the processing device to perform operations comprising, when the comparison reveals that the requestor has not submitted a previous access request that has timed out prior to submission of an acknowledgement corresponding to the previous access request, monitoring, using the intermediary device, a partially-completed connection transaction resulting from the access request to determine whether a time out condition occurs prior to requestor submission of an acknowledgement corresponding to the access request.

15. The storage medium of claim 14 wherein the storage medium is further encoded with instructions that, when executed by the processing device, operate to cause the processing device to perform operations comprising, to the extent that a time out condition is determined to exist, adding, using the intermediary device, information identifying the requestor to the stored information identifying previous requestors for use in comparing against future requestors that submit an access request.

16. A method of handling connection transactions, the method comprising:

receiving, at an intermediary device, a connection transaction request from a requestor device that requests access to an access providing host;

using information identifying requestor devices, of other access providing hosts, that previously submitted a partially-completed connection transaction request to determine whether to block the connection transaction request to the access providing host; and blocking, at the intermediary device, the connection transaction request in response to a determination to block the connection transaction request, wherein the intermediary device is a switch capable of performing load balancing for the access providing host as well as the other access providing hosts.

17. The method of claim 16 wherein using information identifying requestor devices, of other access providing hosts, that previously submitted a partially-completed connection transaction request to determine whether to block the connection transaction request to the access providing host comprises monitoring connection transaction requests across multiple access providing hosts.

18. The method of claim 17 wherein monitoring connection transaction requests across multiple access providing hosts comprises measuring timing of connection transaction requests across multiple access providing hosts.

19. The method of claim 16 wherein using information identifying requestor devices, of other access providing hosts, that previously submitted a partially-completed connection transaction request to determine whether to block the connection transaction request to the access providing host comprises comparing, at the intermediary device, an identity of the requestor device to information identifying requestor devices, of the access providing host as well as the other access providing hosts, that previously submitted a partially-completed connection transaction request that reached a time out condition prior to receipt of an acknowledgement corresponding to the partially-completed connection transaction request.

20. The method of claim 16 further comprising, in response to a determination not to block the connection transaction request, determining, at the intermediary device, whether the connection transaction request results in a partially-completed connection transaction in which a time out condition is reached prior to receipt of an acknowledgement corresponding to the connection transaction request.

21. The method of claim 20 further comprising, in response to a determination that the connection transaction request has reached a time out condition prior to receipt of an acknowledgement corresponding to the connection transaction request, terminating the connection transaction request.

22. The method of claim 20 further comprising, in response to a determination that the connection transaction request has reached a time out condition prior to receipt of an acknowledgement corresponding to the connection transaction request, adding the requestor device to the information identifying requestor devices that previously submitted a partially-completed connection transaction request to enable blocking of future connection transaction requests received from the requestor device.

23. The method of claim 16 wherein, at the time of blocking the connection transaction request, the intermediary device has not previously received, from the requestor device, a connection transaction request that requested access to the access providing host.

24. The method of claim 16 further comprising delaying termination of a partially-completed connection transaction based on the connection transaction request to allow the intermediary device to continue monitoring communications from the requestor device to the access providing host as well as the other access providing hosts.

25. The method of claim 16 further comprising:
blocking, at the intermediary device, the connection transaction request in response to a determination that a return address included in the connection transaction request differs from an actual return address of the requestor device.

26. A networking device comprising:
a processor; and
a memory encoded with machine readable instructions that, when executed by the processor, operate to cause the processor to perform operations comprising:
receiving a connection transaction request from a requestor device that requests access to an access providing host;
using information identifying requestor devices, of other access providing hosts, that previously submitted a partially-completed connection transaction request to determine whether to block the connection transaction request to the access providing host; and
blocking the connection transaction request in response to a determination to block the connection transaction request,
wherein the networking device is a switch capable of performing load balancing for the access providing host as well as the other access providing hosts.

27. The networking device of claim 26 wherein using information identifying requestor devices, of other access providing hosts, that previously submitted a partially-completed connection transaction request to determine whether to block the connection transaction request to the access providing host comprises monitoring connection transaction requests across multiple access providing hosts.

28. The networking device of claim 27 wherein monitoring connection transaction requests across multiple access providing hosts comprises measuring timing of connection transaction requests across multiple access providing hosts.

29. The networking device of claim 26 wherein using information identifying requestor devices, of other access providing hosts, that previously submitted a partially-completed connection transaction request to determine whether to block the connection transaction request to the access providing host comprises comparing an identity of the requestor device to information identifying requestor devices, of the access providing host as well as the other access providing hosts, that previously submitted a partially-completed connection transaction request that reached a time out condition prior to receipt of an acknowledgement corresponding to the partially-completed connection transaction request.

30. The networking device of claim 26 wherein the memory is further encoded with machine readable instructions that, when executed by the processor, operate to cause the processor to perform operations comprising:
in response to a determination not to block the connection transaction request, determining whether the connection transaction request results in a partially-completed connection transaction in which a time out condition is reached prior to receipt of an acknowledgement corresponding to the connection transaction request.

31. The networking device of claim 30 wherein the memory is further encoded with machine readable instructions that, when executed by the processor, operate to cause the processor to perform operations comprising:
in response to a determination that the connection transaction request has reached a time out condition prior to receipt of an acknowledgement corresponding to the connection transaction request, terminating the connection transaction request.

32. The networking device of claim 30 wherein the memory is further encoded with machine readable instructions that, when executed by the processor, operate to cause the processor to perform operations comprising:
in response to a determination that the connection transaction request has reached a time out condition prior to receipt of an acknowledgement corresponding to the connection transaction request, adding the requestor device to the information identifying requestor devices that previously submitted a partially-completed connection transaction request to enable blocking of future connection transaction requests received from the requestor device.

33. The networking device of claim 26 wherein, at the time of blocking the connection transaction request, the networking device has not previously received, from the requestor device, a connection transaction request that requested access to the access providing host.

34. The networking device of claim 26 wherein the memory is further encoded with machine readable instructions that, when executed by the processor, operate to cause the processor to perform operations comprising:

delaying termination of a partially-completed connection transaction based on the connection transaction request to allow the networking device to continue monitoring communications from the requestor device to the access providing host as well as the other access providing hosts.

35. The networking device of claim 26 wherein the memory is further encoded with machine readable instructions that, when executed by the processor, operate to cause the processor to perform operations comprising:

blocking the connection transaction request in response to a determination that a return address included in the connection transaction request differs from an actual return address of the requestor device.

* * * * *